Aug. 18, 1970   J. M. BIDDISON ET AL   3,524,601
ARMATURE WINDING
Filed July 23, 1968   2 Sheets-Sheet 1
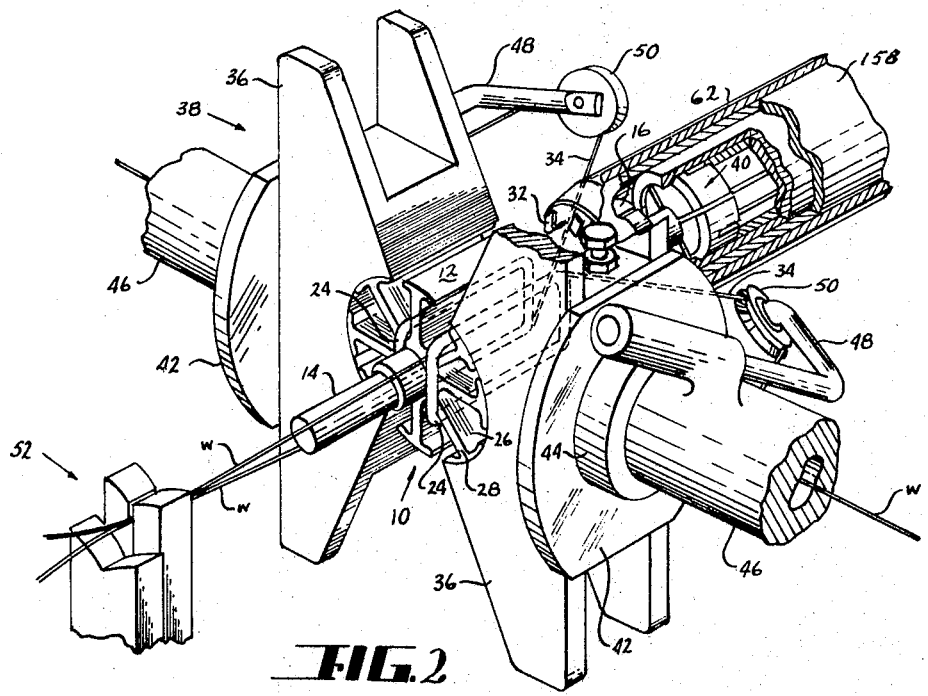
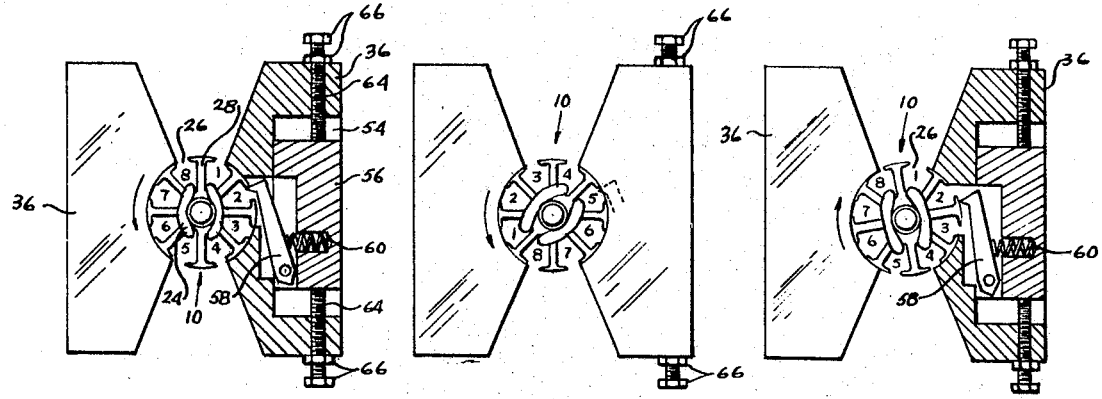
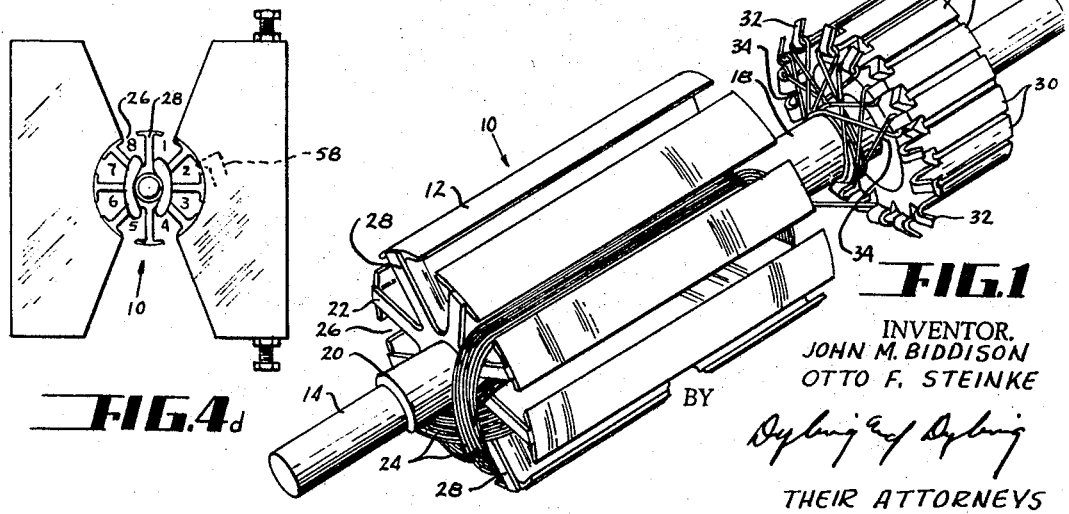
INVENTOR.
JOHN M. BIDDISON
OTTO F. STEINKE
BY
THEIR ATTORNEYS

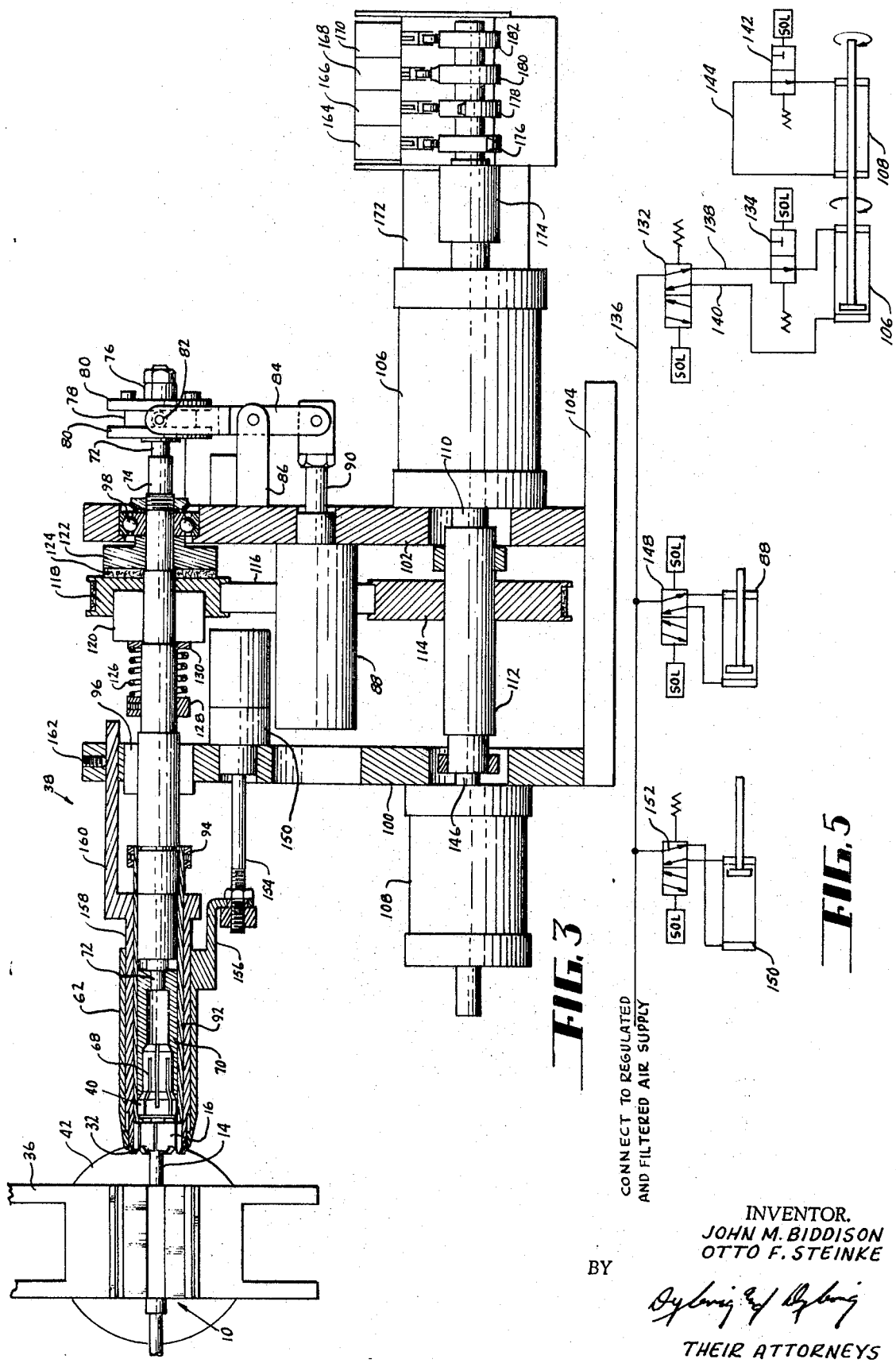

United States Patent Office 3,524,601
Patented Aug. 18, 1970

3,524,601
ARMATURE WINDING
John M. Biddison and Otto F. Steinke, Dayton, Ohio, assignors to The Globe Tool and Engineering Company, Dayton, Ohio, a corporation of Ohio
Filed July 23, 1968, Ser. No. 746,863
Int. Cl. H02k 15/085
U.S. Cl. 242—7.03                              10 Claims

ABSTRACT OF THE DISCLOSURE

A spindle in an armature winding machine to which an armature is chucked is rotated in one direction by a rotary air actuator which drives the spindle through a one-way clutch and in a reverse direction by the same air actuator acting through a slip clutch. A detent mechanism coacting with the armature stops the armature rotation in the reverse direction. The armature rotation is otherwise stopped by a hydraulic braking circuit.

---

This invention relates to armature winding and more particularly to the winding of armatures with commutators having tangs. It will become apparent, however, that some portions of this invention may be useful in other environments.

In the application of Jerry E. Miller, Ser. No. 704,342, titled Armature Winding and filed in the United States Patent Office on Feb. 9, 1968, which application is assigned to the same owner as the instant application, a winding procedure is disclosed wherein, after pairs of coils are wound in an armature and while the fliers are at rest, the armature is rotated in one direction about its axis to loop the lead wires around the armature shaft. At some point, the armature rotation is temporarily discontinued and a pair of commutator tangs exposed so that the fliers may be reversed to hook a portion of the lead wires onto a pair of tangs. As discussed in the aforementioned Miller application, this winding procedure has several advantages, both in connection with the armature itself and in connection with the design of the armature winding machine.

A primary object of this invention is to provide a simple, high speed and flexible method and apparatus for rotating an armature during the automatic winding cycle of an armature winding machine and to insure that the armature is at all times accurately oriented with respect to the fliers and winding forms. This is accomplished in accordance with this invention by using a rotary air actuator which drives a spindle through a one-way clutch in one direction and through a slip clutch in the reverse direction. The armature is chucked to the spindle and a detent mechanism, which can conveniently be located in one of the winding forms, coacts with the teeth of the armature so that, upon rotation of the spindle in the reverse direction, the armature is accurately stopped in a predetermined position.

A further object of this invention is to provide a simple method and apparatus for rotating a spindle and accurately and positively stopping the rotation of the spindle after a predetermined number of degrees of rotation thereof. In accordance with this invention, the spindle is driven by a rotary air actuator braked by a hydraulic actuator.

Other objects and advantages will become apparent from the following description and the drawings in which:

FIG. 1 is a perspective view of a partially wound armature which can be wound using the apparatus of this invention;

FIG. 2 is a perspective view with parts broken away and shown in cross section of a portion of an armature winding machine in accordance with this invention;

FIG. 3 is a cross sectional view of the apparatus for rotating the armature between the winding of coils;

FIG. 4A is a front elevational view with parts in cross section of a portion of the winding forms of FIG. 2 and showing a partially wound armature engaged by a detent mechanism;

FIGS. 4B, 4C and 4D are each similar to FIG. 4A and illustrate in sequence various rotary positions of the armature between the winding of pairs of coils; and FIG. 5 schematically illustrates a pneumatic and a hydraulic circuit used in the armature winding machine of this invention.

Referring to FIG. 1, an armature, generally designated 10, is illustrated including a slotted armature core 12 mounted on an armature shaft 14 upon which a commutator 16 is also mounted. Between the armature core 12 and the commutator 16 is an insulating sleeve 18 overlying the shaft 14. Another insulating sleeve 20 projects from an insulating end lamination 22 on the end of the shaft 14 opposite from the commutator 16. The armature 10 in FIG. 1 is only partially wound with coils 24 which have sides passing through spaced armature slots 26 separated by armature teeth 28. The commutator 16 is of the type having a plurality of peripherally spaced, mutually insulated segments 30 with hooks or tanks 32 at the end thereof adjacent the armature core 12 adapted to receive lead wires 34 which extend between adjacent coils. The armature 10 has twice as many tangs 32 as there are armature slots 26 because two coils 24 are wound in each pair of slots 26 and a commutator or commutator tang connection is made by a lead wire 34 between each of the pairs of coils 24 wound in a pair of slots 26 as well as between successively wound coils 24 in different pairs of slots 26. It will be noted in FIG. 1 that the lead wires 34 are looped about the armature shaft 14 and that a portion of each lead wire 34 is also looped about each of the commutator tangs 32. A more detailed description of this winding pattern appears in the aforementioned Miller application, Ser. No. 704,342.

In FIG. 1, six coils 24 (two in each pair of slots) and their commutator lead connections are shown. The method of fully and automatically winding the armature 10 in accordance with this invention will now be described in connection with the portions of the apparatus shown in FIGS. 2, 4A, 4B, 4C, and 4D. Referring first to FIG. 2, the armature 10 is located beween a pair of wire guide wings or winding forms 36 of a double flier armature winding machine, generally designated 38, the armature being supported partly by the concavely curved surfaces of the wire guide wings 36 and partly by a chuck assembly 40 clamped to the end of the armature shaft 14 adjacent the commutator 16. The wire guide wings 36 are mounted upon mounting plates 42 which have bearing housings 44 thereon that rotatably receive flier spindles 46 upon which are affixed fliers 48. The wires, designated W, for winding the coils 24 in the armature slots 26 are coursed through the flier spindles 46 and around wire guide pulleys 50 on the fliers 48. There are two such wires, one for each of the flier spindles 46. The free ends of the wires W are attached to a combined clamp and cutter mechanism 52. The wires W emanate from wire supplies (not shown) and are placed under tension at or near the wire supplies so that, as the fliers 48 rotate, the wires will be drawn from the wire supplies and guided by the sloping surfaces of the wire guide wings 36 to form a pair of coils 24 into pairs of slots 26 aligned with the wire guiding surfaces of the winding forms 36.

Referring to FIG. 4A, the right hand wire guide wing or winding form 36 has a cavity 54 therein in which is located a detent mechanism comprising a pawl support block 56 and a pawl 58 pivotally mounted thereon. The pawl 58 is biased by a coil spring 60 located in the pawl support block 56 toward the armature core 12 whereby the free end of the pawl 58 projects out of the concavely curved face of the winding form 36 into engagement with a slot 26 of the armature 10. The outwardly projecting portion of the pawl 58 is wedge-shaped with a sloping lower surface and a straight upper stop surface which is remote from the pivot point for the pawl 58. Upon rotation of the armature 10 in a counterclockwise direction, the pawl 58 is cammed out of the slots 26. On a reverse or clockwise rotation of the armature 10, the pawl 58, upon entering one of the slots 26, will engage the surface of the adjacent tooth 28 and thereby positively stop rotation of the armature 10.

For convenience, the slots 26 in FIGS. 4A, 4B, 4C and 4D have been separately identified by the numbers 1 through 8. In FIG. 4A it will be noted that the first pairs of coils 24 have been wound in slots 1 and 4 and in slots 5 and 8 while the pawl 58 is engaged with the adjacent surface of the tooth 28 between the slots 1 and 2. FIG. 2 also shows parts of the machine 38 at the end of the winding of the first pair of coils 24. The fliers 48 are stopped adjacent the commutator end of the armature 10 and the lead wires 34 extend from the wound coils 24 and adjacent the commutator 16 to the flier pulleys 50. At this time and also during the winding of the coils 24, a tubular tank shield 62, which overlies the commutator 16 and abuts the free end portions of the tangs 32, prevents wire from hooking onto any of the tangs 32.

The fliers 48 temporarily remain at rest in the position shown in FIG. 2, and the armature 10 is rotated, by rotation of the chuck assembly 40, as will be described below, about its longitudinal axis through a predetermined angle in a generally counterclockwise direction. In FIG. 4B, the armature 10 is shown after being rotated in a counterclockwise direction through such a predetermined angle, at which time the rotation of the armature 10 is stopped for the purpose of hooking the lead wires 34 about preselected commutator tangs 32. The tang shield 62 is, accordingly, retracted so that the lead wires 34 will be free to engage the tangs 32. At this time the fliers 48 are rotated in a direction opposite to the direction used in winding the coils 24 through an angle sufficient to lay a portion of the lead wires 34 into the bight portions of oppositely disposed commutator tangs 32. The tang shield 62 is then moved back into a position whereat it shields the tangs 32 and is effective to confine the lead wires 34 in the bight portions of the tangs 32. The counterclockwise rotation of the armature 10 is then resumed and continued until the armature 10 is a few degrees past the desired position for aligning the pairs of armature slots 26 to receive the next pair of coils with the wire guide surfaces of the winding forms 36. Because the armature 10 illustrated herein is to have two coils per slot, the second pair of coils 24 to be wound will be wound in the same slots, namely slots 1 and 4 and 5 and 8 as were the first pair of coils 24. FIG. 4C shows the position of the armature 10 at the end of this counterclockwise rotation which, as can be determined from a comparison with FIG. 4A, is through an angle in excess of 360°. The counterclockwise rotation is not so great, however, as to cause the pawl 58 to enter the slot 3.

At this time, the armature 10 is rotated in a reverse direction, that is a clockwise direction as viewed in FIG. 4C, until the armature 10 reaches the position illustrated in FIG. 4D at which time the pawl 58 again enters the armature slots designated 2 and is engaged by the adjacent surface of the tooth 28 between the slots 1 and 2. The armature 10 is now in a position to receive the second pair of coils 24. It will be noted that this position of the armature 10 is predetermined quite accurately because it relies upon the fixed stop provided by the pawl 58. Further, the entire detent assembly may be accurately positioned within the right side winding form 36 by adjusting screws 64, the adjusted position of which is maintained by jamb nuts 66.

The foregoing procedure is repeated except that, after the winding of the next pair of coils 24 in the same pair of slots 26, the armature 10 will be stopped at a different position so that pairs of coils 24 will then be wound into different pairs of adjacent slots 26. Thus, the third pairs of coils wound could be located in slots 8 and 3 and slots 4 and 7 or else in slots 2 and 5 and slots 6 and 1. Those skilled in the art will understand that the foregoing operations are continued until the armature 10 is fully wound. The armature 10 is then removed from the winding area between the winding forms 36 and an unwound armature 10 replaced thereby. It will also be realized by those skilled in the art that the loading and unloading of the armature 10 can be accomplished automatically and that, for example, the cutting of the wire from the wound armature 10 as well as the handling of the armature 10 after the winding can be accomplished in various fashions. Suitable hydraulic or electromechanical drives for synchronously rotating fliers are known and in use and, therefore, the drive mechanisms for the fliers 48 are not illustrated in detail herein. U.S. Pat. No. 3,013,737, issued to Harry W. Moore on Dec. 19, 1961, illustrates a hydraulic drive mechanism which could be used with the apparatus shown in FIG. 2. It will be appreciated that the wire guide wings or winding forms 36 must be moved slightly away from the armature core 12 when the armature 10 is rotated. The same Pat. No. 3,013,737, shows an air actuator arrangement for accomplishing this movement.

Referring to FIG. 3, which illustrates the mechanism for rotating the armature 10, the chuck assembly 40 is shown as including a collet 68 which grips the armature shaft 14 in response to movement of a generally tubular collet actuator 70 driven by a collet operator shaft 72 that extends through a hollow main drive spindle 74. The end of the collet operator shaft 72 remote from the collet 68 receives a bushing 76 and is rotatably mounted in a bearing 78 confined between spaced bearing retainer rings 80 which together form a yoke ring receiving confronting drive pins 82 of a double ended yoke 84 pivotally mounted on a bracket 86. The yoke 84 is driven by a linear air actuator 88 having a piston rod 90 pivotally connected to the bottom of the yoke 84. As apparent, movement of the collet operator shaft 72 to the left, as viewed in FIG. 3 will cause the collet actuator 70 to bear against the collet 68. The collet 68 and the collet actuator 70 are partially surrounded by a tubular collet retainer 92 which holds the collet 68 in place and against which the collet actuator 70 is urged. The collet retainer 92 is affixed to the main drive spindle 74 for rotation therewith. This can be done in any convenient fashion and the lock illustrated in FIG. 3 is in the form of a clamp ring 94.

The main drive spindle 74 is journalled by bearings 96 and 98 in a front stanchion 100 and a rear stanchion 102, respectively, mounted upon a suitable base or support plate 104. The aforementioned collet air actuator 88 is mounted on the rear stanchion 102. Also supported on the rear stanchion 102 is an air operated rotary actuator 106 which constitutes the drive motor for rotating the spindle 74 and, accordingly, the armature 10. A hydraulic rotary actuator 108 which, as will be described below, is used as a brake for accurately stopping the rotation of the spindle shaft 74, is supported on the front stanchion 100. The air actuator 106 is of the type that rotates from a given angular "start" position in a first direction when air or other gas under pressure is supplied to one end thereof and returns to the start position when air or other gas under pressure is supplied to the other end thereof. The total angular rotation from the start position depends upon the length of time fluid is supplied thereto. The hydraulic actuator 108 may be of the same type, but is powered by an incompressible liquid. Such actuators are commercially available. Thus, the air actuator 106 may be of the type known as the "Tork-Mor" Model SB-3-3 whereas the hydraulic actuator 108 may be of the type known as the "Tork-Mor" Model S–2–2, both sold by the Roto Actuator Corporation of St. Clair Shores, Mich. The drive mechanism connecting the air actuator 106 to the armature 10 will now be described in detail.

The air actuator 106 has an output shaft 110 keyed to a drive shaft 112 upon which is mounted a drive pulley 114 connected by a timing belt 116 to a driven pulley 118 which in turn is connected to the main drive spindle 74 by a one-way or sprag clutch 120. The one-way clutch 120 positively drives the spindle 74 in the "forward" or first direction described above, that is counterclockwise as viewed in FIG. 2, but the clutch 120 is free-wheeling when the driven pulley 118 is rotated in a reverse direction by the motor or air actuator 106. Because, as discussed above in connection with FIGS. 4C and 4D, it is desired to rotate the armature 10 through a small angle in a reverse direction upon reversal of the motor or rotary air actuator 106, a slip clutch is provided between the driven pulley 118 and the spindle 74. The slip clutch includes a friction or clutch disc 122 affixed to the spindle 74 adjacent the driven pulley 118 and a clutch or friction pad 124, which may comprise a leather washer or the like interposed between the rear face of the driven pulley 118 and the clutch disc 122. The clutch pad 124 is constantly maintained engaged with the driven pulley 104 and the clutch disc 122. For this purpose the driven pulley 118 as well as the one-way clutch 120 are slidably mounted on the spindle 74 and a coil spring 126, which has one end engaged with a collar 128 affixed to the spindle 74 and its other end engaged with a washer 130 abutted against the one-way clutch 120, constantly biases the driven pulley 118 into frictional engagement with the clutch disc 122.

With reference to FIGS. 3 and 5, the air actuator 106 is connected to a regulated source of air under pressure through a solenoid operated direction control valve 132 and a normally open solenoid operated air shut-off valve 134. The direction control valve 132 serves selectively to connect a main air supply line 136 to one of the two conduits, designated 138 and 140, which are connected to the opposite ends of the air actuator 106 whereas the shut-off valve 134 is located only in the conduit 138. Air under pressure supplied through the conduit 138 causes the output shaft 110 to rotate from its rest or start position. When it is desired to discontinue the rotation of the armature 10, say in the position shown in FIG. 4C, a normally open solenoid controlled hydraulic shut-off valve 142 is energized to block continued flow of hydraulic fluid through hydraulic conduits 144 which are connected to the opposite ends of the hydraulically operated rotary actuator 108 and form a closed circuit. When fluid flow through this closed circuit is blocked by operation or energization of the hydraulic shut-off valve 142, the output shaft, designated 146, of the hydraulic actuator 108 is dynamically braked. The output shafts 110 and 146 of the two actuators are interconnected by the drive shaft 112, and the rotary air actuator 106 is thus rendered inoperative. As a precaution, the air shut-off valve 134 is closed at the same time as the hydraulic shut-off valve 142. When the hydraulic valve 142 is opened to permit flow of fluid through the conduits 144 and the hydraulic actuator 108, its output shaft 146 is driven by the air actuator 106 without any substantial interference. The air valve 134 must, of course, be open at the same time.

A bank of four limit switches 164, 166, 168 and 170 are shown in FIG. 3 mounted on a bracket 172 adjacent the air operated rotary actuator 106. The limit switches 164 through 170 are connected in electric circuitry (not shown) for controlling the operation of the air actuator 106 and the hydraulic actuator 108. For this purpose, the output shaft 110 of the air actuator 106 projects from the end thereof opposite the drive shaft 112 and is connected to a switch operator shaft 174 upon which are affixed four cams 176, 178, 180 and 182 which sequentially change the open or closed conditions of the switches 164 through 170, respectively. When the switches 164, 166, 168 and 170 are engaged by the cams 176, 178, 180 and 182, both shut-off valves 134 and 142 are actuated to block further flow of air and hydraulic fluid to the actuators 106 and 108, respectively.

All four cams and switches are used when winding an armature having two coils per slot. Cam controlled switches or the like (not shown) cause the shut-off valves 134 and 142 to be open when the fliers 48 reach the position shown in FIG. 1 after the winding of a pair of coils 24. The counterclockwise rotation of the armature 10 is thus initiated. When, thereafter, the switch 166 is engaged by the cam 178, the solenoids of both shut-off valves 134 and 142 are energized, whereupon the valves close to stop the rotation of the armature 10 when the lead wires 34 are to be hooked about the tangs 32. Other switch means (not shown) signal the completion of this operation by de-energizing the solenoids of the shut-off valves 134 and 142. The rotation of the armature 10 continues until the switch 164 is engaged by the cam 176 and again the solenoids of the shut-off valves 134 and 142 are energized to stop the armature 10 in the position shown in FIG. 4C. The direction control valve 132 is then energized to reverse the flow of air to the air actuator 106 and the shut-off valves 134 and 142 are opened whereupon the air actuator output shaft 110 returns to its start position. As already described, the resultant clockwise rotation of the armature 10 through the action of the slip clutch positions the armature 10 in preparation for the winding of the second pairs of coils 24 in the same slots 26. As soon as the output shaft 110 returns to its start position, the direction control valve 132 is de-energized. Accordingly, after the second pairs of coils 24 have been wound, the armature 10 is again rotated in a counterclockwise direction until the switch 170 is engaged by the cam 182 for stopping the armature 10 in an appropriate position for making the tang connections from the second pair of wound coils. The cam 180 engages the switch 168 for stopping the rotation of the armature 10 in preparation for the winding of the third pair of coils 24, which, as discussed above, will be located in other pairs of slots 26. The same four switches will operate in the same sequence throughout the winding of an armature, there being no other indexing or rotation of the armature required than that discussed herein. Of course, it is to be understood that all the functions of the machine 38 may be entirely automatic through the use of conventional machine controls and circuitry which, because they are conventional, are not illustrated or described in detail herein.

The pneumatic circuit illustrated in FIG. 5 also shows the collet air actuator 88 connected through a direction control valve 152 to the main air line 136. Referring to FIG. 3, the shield actuator 150 may be mounted on the front stanchion 100 with its piston rod, designated 154, connected to a bracket 156 which may be connected to or integral with the movable shield 62. The movable shield 62 is shown surrounding an adjustably fixed inner shield 158 to which a guide rod 160 is connected that projects through an aperture in the front stanchion 100 and held in adjustably fixed position therein by a set screw 162. This connection of the guide rod 160 to the front stanchion prevents the inner shield 158 from rotating with the chuck assembly 40. As will be understood by those skilled in the art, the inner shield 158 has notches at its free end which will be adjacent commutator tangs 32 that are exposed when the movable shield 62 is retracted. Thus, the inner shield 158 prevents wire from accidentally catching on any but the exposed tangs 32. This arrangement of both the inner fixed shield 158 and the movable outer shield 62 is desirable when the tangs 32 are quite closely spaced.

The speed of operation, the simplicity, and flexibility of the controls resulting from the apparatus of this invention should be apparent to those skilled in the art. For example, rotary actuators are commercially available which have a rotary throw exceeding that required for armature winding applications. It is possible to vary the throw or rotation of the armature being wound to satisfy the requirements of various winding patterns merely by changing the positions of the various cams 176, 178, 180 and 182 on the switch operator shaft. Armatures requiring only a single coil per slot may be wound by the apparatus described above with only two of these four switches being used. Also, this invention is useful when winding armatures having numbers of slots other than eight, whether odd or even, as will be well understood by those skilled in the art.

Having thus described our invention, we claim:

1. In an armature winding method of the type wherein an armature is rotated about its shaft by means engaging the armature shaft to position slots of said armature relative to wire guiding surfaces of a pair of winding forms and fliers for receiving coils wound by said fliers, the improvement comprising the steps of rotating said armature in a first direction past its desired position, reversing the rotation of said armature, and interposing a pawl in one of said armature slots whereupon said armature upon reverse rotation thereof engages said pawl and is thereby accurately positioned with respect to said wire guiding surfaces and said fliers.

2. The method of claim 1 further including the steps of pivotally mounting said pawl in one of said winding forms and biasing said pawl into a position wherein it engages in slots of said armature core, and camming said pawl out of the slots in which it enters as said armature is rotated in said first direction.

3. The method of claim 1 wherein said armature is rotated in both directions by a reversible drive motor and wherein said reversible drive motor is connected to said armature for rotation in said first direction by a one-way clutch and connected for rotation in said reverse direction by a slip clutch.

4. In an armature winding machine of the type wherein coils are wound into the slots of an armature core by rotating fliers supplying wire thereto, the wire being guided into selected slots of said armature core by wire guiding surfaces on a pair of winding forms, and of the type wherein lead wires between coils are formed by appropriately rotating the armature and the fliers to hook portions of the lead wire about preselected commutator tangs, said armature being rotated by drive means including a chuck engaging the armature shaft and a rotating spindle to which said chuck is connected, the improvement comprising a reversible drive motor, drive means connecting said reversible drive motor to said spindle, said drive means including a one-way clutch between said reversible drive motor and said spindle for rotating said armature in a first direction and a slip clutch between said reversible drive motor and said spindle for rotating said armature in a reverse direction, and means for stopping the rotation of said armature during rotation of said reversible drive motor in the reverse direction.

5. The apparatus of claim 4 wherein said last mentioned means includes a pawl mounted in one of said winding forms, means biasing said pawl into the slots between the teeth of the armature core, said pawl having a sloping surface thereon effective when said armature is rotated in said first direction to cause said pawl to be removed from said slots by the engagement of armature core surfaces therewith whereupon said armature core is rotated in said first direction by said one-way clutch and rotated in said reverse direction by said slip clutch until said pawl is engaged by one of said armature teeth.

6. The apparatus of claim 5 wherein said pawl is pivotally mounted upon a pawl support member confined in a cavity in said one of said winding forms.

7. The apparatus of claim 6 further comprising means for adjusting the vertical height of said pawl support member within said one of said winding forms.

8. The apparatus of claim 4 wherein said drive motor is an air operated rotary actuator.

9. The apparatus of claim 8 further including a hydraulically operated rotary actuator, means connecting the output shaft of said hydraulically operated rotary actuator to the output shaft of said air operated rotary actuator, and means operating in timed relation to the operation of said air operated rotary actuator preventing further rotation of said output shaft of said hydraulically operated rotary actuator and thereby rotation of said output shaft of said air operated rotary actuator.

10. The apparatus of claim 9 wherein a closed hydraulic circuit interconnects the opposite ends of said hydraulically operated rotary actuator, and wherein said last mentioned means comprises valve means in said closed hydraulic circuit operable to prevent flow of hydraulic fluid through said circuit.

References Cited

UNITED STATES PATENTS

| | | | |
|---|---|---|---|
| 2,348,948 | 5/1944 | Allen | 242—7.05 |
| 2,670,145 | 2/1954 | Biddison | 242—7.05 |
| 2,949,554 | 8/1960 | Biddison | 310—206 |
| 3,076,613 | 2/1963 | Turk | 242—7.05 |
| 3,142,890 | 8/1964 | Adams et al. | 29—605 XR |
| 3,163,921 | 1/1965 | Applegate | 242—7.03 XR |

BILLY S. TAYLOR, Primary Examiner

U.S. Cl. X.R.

29—605; 74—821; 242—7.05